(12) United States Patent
Okawa et al.

(10) Patent No.: US 10,414,195 B2
(45) Date of Patent: Sep. 17, 2019

(54) ANTI-COUNTERFEITING MEDIUM AND METHOD FOR FABRICATING ANTI-COUNTERFEITING MEDIUM

(71) Applicant: TOPPAN PRINTING CO., LTD., Tokyo (JP)

(72) Inventors: Mihoko Okawa, Tokyo (JP); Hideki Ochiai, Tokyo (JP); Koji Ichikawa, Tokyo (JP); Yuki Kotegawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 20 days.

(21) Appl. No.: 15/264,170

(22) Filed: Sep. 13, 2016

(65) Prior Publication Data

US 2017/0001461 A1    Jan. 5, 2017

Related U.S. Application Data

(63) Continuation of application No. PCT/JP2015/059402, filed on Mar. 26, 2015.

(30) Foreign Application Priority Data

Mar. 26, 2014    (JP) .................................. 2014-063729

(51) Int. Cl.
*G02B 5/30* (2006.01)
*B42D 25/364* (2014.01)
(Continued)

(52) U.S. Cl.
CPC .............. *B42D 25/364* (2014.10); *B41M 3/14* (2013.01); *B42D 25/21* (2014.10); *B42D 25/23* (2014.10);
(Continued)

(58) Field of Classification Search
CPC ...... B42D 25/36; B42D 25/364; B42D 25/41; G02F 5/30; G02F 5/3025
(Continued)

(56) References Cited

U.S. PATENT DOCUMENTS 5,284,364 A * 2/1994 Jain ........................ B42D 25/00
283/90
6,082,778 A * 7/2000 Solmsdorf ........... B42D 25/328
283/107
(Continued)

FOREIGN PATENT DOCUMENTS

EP    0 980 536    2/2000
EP    1 189 079    3/2002
(Continued)

OTHER PUBLICATIONS

03141320A Translation (Year: 1991).*
(Continued)

*Primary Examiner* — Kyle R Grabowski
(74) *Attorney, Agent, or Firm* — Foley & Lardner LLP (57) ABSTRACT

An anti-counterfeiting medium includes a recording medium, a polarizer layer arranged on a part of the recording medium. The polarizer layer is formed thereon with a low extinction-ratio area that forms an image portion where a polarizer exhibits an extinction ratio lower than in a portion other than the low extinction-ratio area of the polarizer layer. The recording medium is formed thereon with an image portion that is a part of the recording medium and has a nature different from that of a portion other than the part of the recording medium.

15 Claims, 5 Drawing Sheets

(51) Int. Cl.
- *B42D 25/36* (2014.01)
- *B42D 25/41* (2014.01)
- *B41M 3/14* (2006.01)
- *B42D 25/378* (2014.01)
- *B42D 25/21* (2014.01)
- *B42D 25/382* (2014.01)
- *B42D 25/387* (2014.01)
- *B42D 25/23* (2014.01)
- *B42D 25/47* (2014.01)
- *B42D 25/391* (2014.01)
- *B42D 25/24* (2014.01)
- *B42D 25/29* (2014.01)

(52) U.S. Cl.
CPC ............ *B42D 25/24* (2014.10); *B42D 25/29* (2014.10); *B42D 25/36* (2014.10); *B42D 25/378* (2014.10); *B42D 25/382* (2014.10); *B42D 25/387* (2014.10); *B42D 25/391* (2014.10); *B42D 25/41* (2014.10); *B42D 25/47* (2014.10); *G02B 5/30* (2013.01); *G02B 5/3016* (2013.01); *G02B 5/3025* (2013.01); *G02B 5/3033* (2013.01)

(58) Field of Classification Search
USPC .......................................................... 283/90
See application file for complete search history.

(56) References Cited

U.S. PATENT DOCUMENTS

| | | | | |
|---|---|---|---|---|
| 9,501,697 | B2* | 11/2016 | Rosset | B42D 25/29 |
| 2005/0072959 | A1* | 4/2005 | Moia | B42D 25/364 |
| | | | | 428/1.1 |
| 2008/0054621 | A1 | 3/2008 | Burchard et al. | |
| 2008/0088859 | A1* | 4/2008 | Depta | B42D 25/41 |
| | | | | 358/1.7 |
| 2008/0250954 | A1* | 10/2008 | Depta | B42D 25/29 |
| | | | | 283/67 |
| 2009/0008926 | A1 | 1/2009 | Depta et al. | |
| 2009/0127844 | A1* | 5/2009 | Dorfler | B42D 25/405 |
| | | | | 283/94 |

FOREIGN PATENT DOCUMENTS

| | | | |
|---|---|---|---|
| JP | S49-131142 A | | 12/1974 |
| JP | 03141320 A | * | 6/1991 |
| JP | H08-043804 A | | 2/1996 |
| JP | 2000-242748 A | | 9/2000 |
| JP | 2001-239762 A | | 9/2001 |
| JP | 2002-226740 A | | 8/2002 |
| JP | 2006-103221 A | | 4/2006 |
| JP | 2006-123174 A | | 5/2006 |
| JP | 2007-001130 A | | 1/2007 |
| JP | 2007-105732 A | | 4/2007 |
| JP | 2010-282153 A | | 12/2010 |
| WO | WO-98/52077 | | 11/1998 |
| WO | WO-2006/018172 | | 2/2006 |

OTHER PUBLICATIONS

Extended European Search Report dated Feb. 13, 2018 in corresponding application No. 1576882.1.
Partial Supplementary European Search Report issued in EP patent application No. 15768882.1 dated Oct. 19, 2017.
International Search Report issued in International Patent Application No. PCT/JP2015/059402 dated Jun. 2, 2015.

* cited by examiner

ANTI-COUNTERFEITING MEDIUM AND METHOD FOR FABRICATING ANTI-COUNTERFEITING MEDIUM

CROSS-REFERENCE TO RELATED PATENT APPLICATIONS

This application is a continuation application filed under 35 U.S.C. § 111(a) claiming the benefit under 35 U.S.C. §§ 120 and 365(c) of PCT International Application No. PCT/JP2015/059402 filed on Mar. 26, 2015, which is based upon and claims the benefit of priority of Japanese Application No. 2014-063729, filed on Mar. 26, 2014, the entire contents of them all are hereby incorporated by reference.

TECHNICAL FIELD

The present invention relates to an anti-counterfeiting medium and a method for fabricating an anti-counterfeiting medium.

BACKGROUND

Many information authentication media, such as passports and ID (identification) cards, use facial images to enable visual information authentication. For example, conventionally, in a passport, a piece of photographic paper, with a facial image printed thereon, is stuck to the booklet body of the passport. However, there is a risk that such a passport is falsified by replacement of the printed image with another one.

For this reason, recent trends are toward digitizing facial image and reproducing the facial image on a booklet body. Methods for reproducing such an image now being considered include a thermal transfer recording method using a transfer ribbon, such as a resin-mold melt type transfer ribbon or a wax melt type transfer ribbon, in which a sublimable, i.e. thermally transferable, dye or pigment is dispersed, or an electrophotographic method.

Methods for reproducing an image on a passport include, besides the above mentioned ones, a recording method using an ink jet printer (PTL 1), a laser printing/recording method using a carbon dioxide gas laser or YAG (yttrium aluminum garnet) laser or using a heat-sensitive color-producing reagent (PTL 2), or a laser engraving printing/recording method with which data can also be printed/recorded in a depth direction of a base using carbon (C) present in the base (PTL 3).

Further, known image displays equipped with this type of recognition data include a display in which an image pattern formed on the basis of image data is provided on a card base made such as of polyvinyl chloride. Also, there is a known display which is provided, in addition to the above image pattern, with an OVD (optically variable device) image represented by an image obtained by using a hologram or a diffraction grating, or by using an optical thin film that makes use of multi-layer interference. It should be noted that optical thin films can exhibit an effect such as color shifting by virtue of their optical design.

Hologram or diffraction grating structures are each used as an anti-counterfeiting means by being stuck onto various objects. The various objects include various cards, such as credit cards, cash cards, membership cards, company ID cards, prepaid cards and driving licenses, various paper credits, such as money coupons, gift tickets and stock certificates, various business forms, such as application forms, bill-payment receipts and duplicate slips, and various booklets, such as passports, passbooks, pension books, generally used pocketbooks and books, and panels, such as displays.

The anti-counterfeiting media on which such OVD images are formed can be easily forged because these media can be visually recognized. As a measure against this, there has been recently proposed an anti-counterfeiting technique using a covert function for determining authenticity by making use of a polymer liquid crystal material. The covert function normally disables visual confirmation of a latent image but enables visual confirmation of the latent image only when a filter is held over the latent image (PTL 4).

As a method for forming a desired image having the covert function mentioned above, PTL 5 proposes an anti-counterfeiting medium in which a desired birefringent pattern is formed. The birefringent pattern can be formed by patterning an ink composition that contains a liquid crystal compound on an oriented layer by means of an inkjet method.

In PTL 6, color component materials used for coloring layers producing black or other colors can also be used for a coloring layer of a recording medium. PTL 6 proposes that a method of using a heat-sensitive microcapsule is a scheme effective for producing color with low energy.

PTL 7 shows, as an example, another color component material composed of a compound and a photopolymer that enable laser marking.

The material disclosed as an example in PTL 7 is used as a material that contains at least one of: a plastic material that is modified by laser irradiation; an inorganic material that accelerates modification; a plastic material that contains an organic material; and an inorganic material that absorbs irradiated laser and generates heat.

CITATION LIST

PTL 1: JP-A-2002-226740
PTL 2: JP-A-S49-131142
PTL 3: JP-A-2006-123174
PTL 4: JP-A-H08-043804
PTL 5: JP-A-2010-282153
PTL 6: JP-A-2006-103221
PTL 7: JP-A-2007-105732

SUMMARY OF THE INVENTION

Technical Problem Attempting to be Solved

However, in the anti-counterfeiting medium and a method for fabricating an anti-counterfeiting medium described in PTL 5, the optical axis of the birefringent pattern is only uniaxially oriented. Accordingly, the resultant latent image is a simple image of only one kind. Such an anti-counterfeiting measure with a sole simple latent image has a drawback of being easily falsified.

The present invention has as its object to provide an anti-counterfeiting medium which can facilitate authenticity determination and enhance resistance against forgery or falsification, and to provide a method for fabricating an anti-counterfeiting medium.

Possible Improvement of or Solution to Problem

The anti-counterfeiting medium related to the present invention includes: a recording medium; and a polarizer layer arranged on a part of the recording medium, characterized in that: the polarizer layer is provided thereon with a low extinction-ratio area that forms an image portion where a polarizer exhibits an extinction ratio lower than in a portion other than the low extinction-ratio area of the polarizer layer; the recording medium is formed thereon with an image portion that is a part of the recording medium and has a nature different from that of a portion other than the part of the recording medium.

The anti-counterfeiting medium related to the present invention includes: a recording medium; a polarizer layer arranged on a part of the recording medium and configured to irreversibly vary an efficiency of changing light irradiated to the polarizer layer into polarized light, by means of a specific external stimulation; and an image continuously formed across the recording medium and the polarizer layer. The anti-counterfeiting medium is characterized in that the image includes a first portion formed in the recording medium and a second portion formed in the polarizer layer; the first portion has a color different from that of a portion where the first portion is not formed in the recording medium; and the second portion has a lower efficiency of changing the light irradiated to the polarizer layer into polarized light than in a portion where the second portion is not formed in the polarizer layer.

The method for fabricating an anti-counterfeiting medium related to the present invention is characterized in that the method includes: preparing a recording medium; arranging a polarizer layer on a part of the recording medium; and continuously forming an image across the polarizer layer and the recording medium by heating using laser engraving or a thermal head.

DESCRIPTION OF REPRESENTATIVE EMBODIMENTS

With reference to the drawings, hereinafter is described an embodiment of the present invention.

Figure 1A:
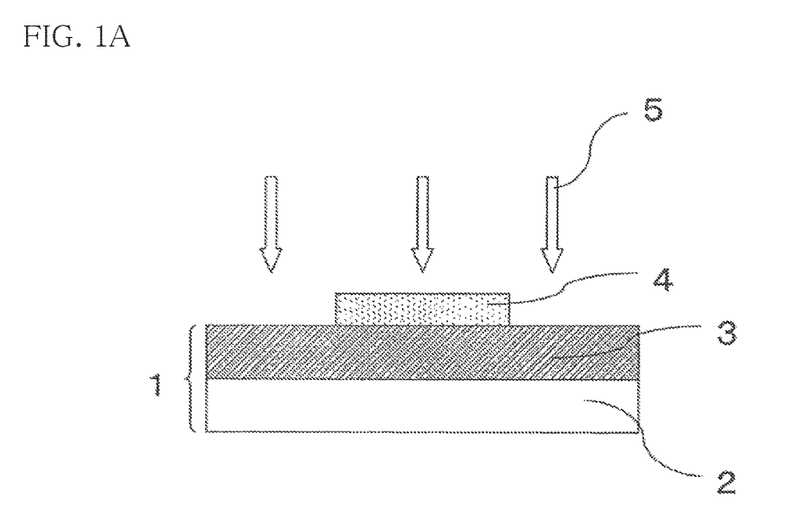
FIG. 1A shows a cross-sectional view illustrating a cross-sectional structure of an anti-counterfeiting medium related to an embodiment of the present invention, together with a laser irradiated to the anti-counterfeiting medium.

FIG. 1A is a cross-sectional view taken along a thickness direction of an anti-counterfeiting medium. The anti-counterfeiting medium shown in FIG. 1A includes a recording medium 1 having a core 2 and a coloring layer 3, and a polarizer layer 4 arranged on a part of an upper surface of the coloring layer 3. The polarizer layer 4 has uniaxial orientation properties. FIG. 1A shows a state where the recording medium 1 and the polarizer layer 4 are being subjected to engraving by means of a laser 5.

Figure 1B:
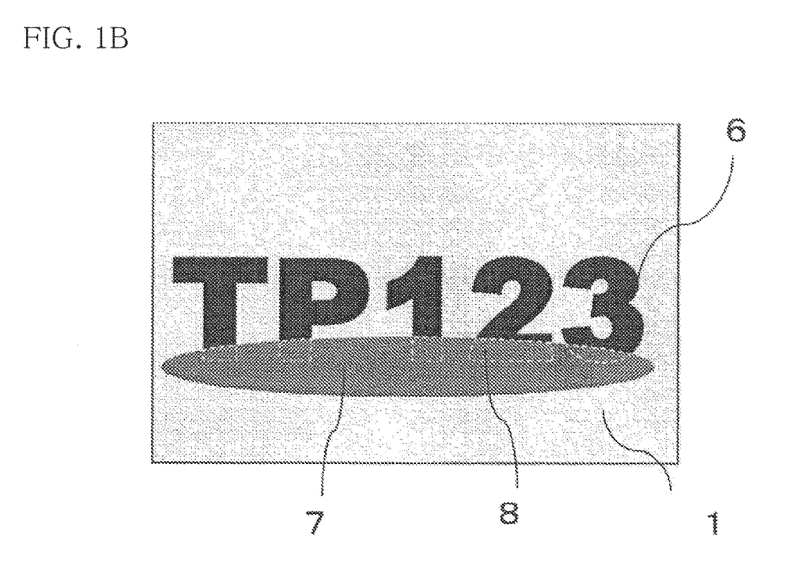
FIG. 1B shows a plan view illustrating a planar structure of the anti-counterfeiting medium.

FIG. 1B is a plan view illustrating the anti-counterfeiting medium. The anti-counterfeiting medium shown in FIG. 1B is formed with an image 6 that includes portions displayed in black. The image 6 is formed in a part of the recording medium 1 by laser engraving. In the image 6, each portion formed in the recording medium 1 is a part of the recording medium 1 and has a nature different from that of portions other than this part of the recording medium 1. Specifically, in the image 6, each portion formed in the recording medium 1 has a nature that has been modified by laser engraving of the recording medium 1, and thus is different from the nature of other portions of the recording medium 1. The polarizer layer 4 includes a polarizing section 7 and low extinction-ratio areas 8. The low extinction-ratio areas 8 correspond to portions to which the laser 5 has been irradiated in the polarizer layer 4. The polarizing section 7 corresponds to a portion to which the laser 5 has not been irradiated in the polarizer layer 4. The low extinction-ratio areas 8 have a lower extinction ratio of the polarizer than does the portion other than the low extinction-ratio areas 8 in the polarizer layer 4, i.e. than does the polarizing section 7. In this way, the polarizer layer 4 is divided into the polarizing section 7 and the low extinction-ratio areas 8, but the polarizing section 7 cannot be visually distinguished from the low extinction-ratio areas 8.

As described above, in the anti-counterfeiting medium of the present embodiment, the polarizer layer 4 is arranged on a part of the recording medium 1, and the image 6 is continuously formed across the polarizer layer 4 and the recording medium 1 by laser engraving.

Figure 2A:
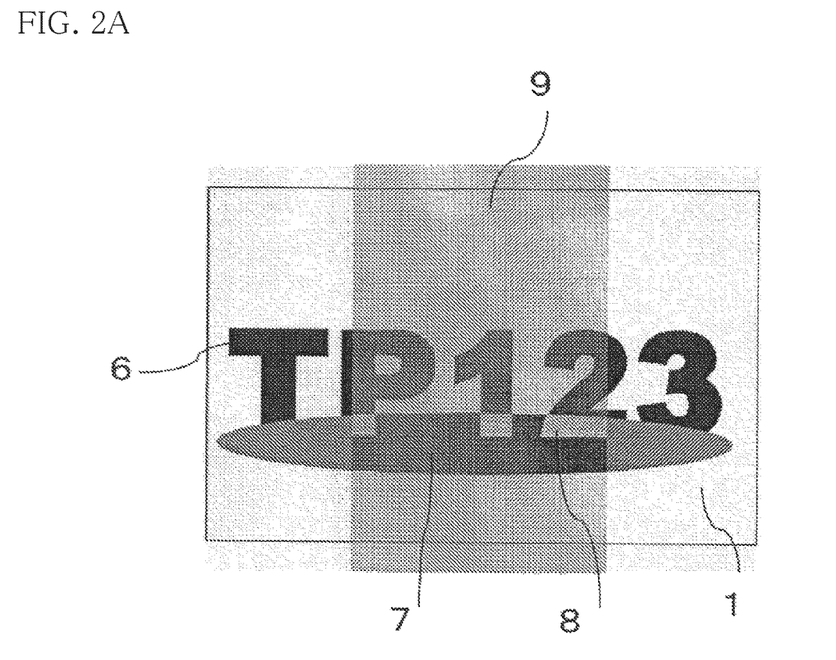
FIGS. 2A and 2B show a set of diagrams each illustrating a latent image which can be visually observed when a verification device is held over the anti-counterfeiting medium illustrated in FIGS. 1A and 1B.
Figure 2B:
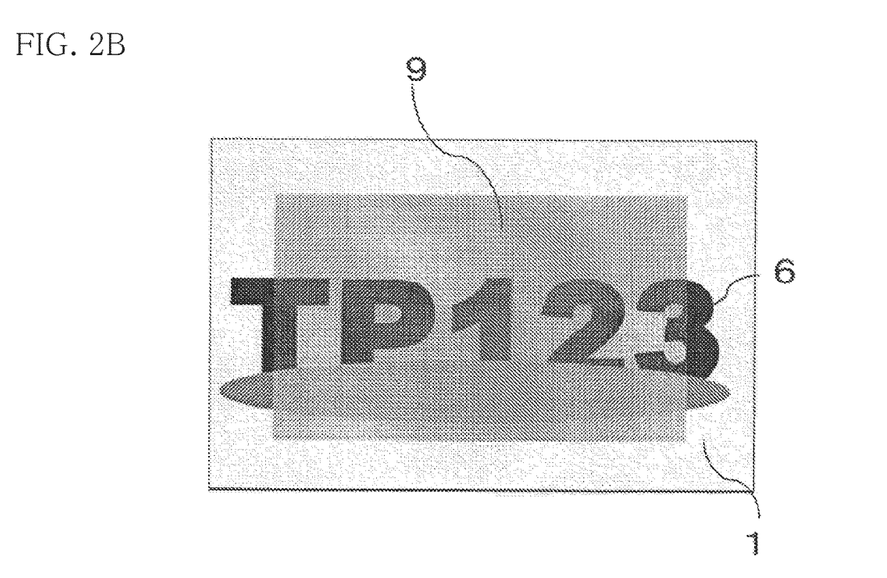

FIGS. 2A and 2B show a set of diagrams each illustrating a latent image that can be visually observed when a verification device is held over the anti-counterfeiting medium shown in FIGS. 1A and 1B.

It should be noted that holding a verification device over the anti-counterfeiting medium refers to interposing the verification device between the anti-counterfeiting medium and the naked eye or a camera or the like that visually observes the front surface of the anti-counterfeiting medium, i.e. the surface where the polarizer layer 4 is located.

In the anti-counterfeiting medium shown in FIGS. 1A and 1B, portions of the polarizer layer 4 exhibit low polarization due to the irradiation of the laser 5. Therefore, the polarizer layer 4 has the polarizing section 7 and the low extinction-ratio areas 8. For example, the polarizing section 7 cannot be directly visually distinguished from the low extinction-ratio areas 8 by the naked eye. Specifically, portions of the polarizer layer 4 have been irradiated by the laser 5 and modified into the low extinction-ratio areas 8 having a lower efficiency of changing light applied to the polarizer layer 4 to predetermined polarized light, compared to the polarizing section 7 where the laser 5 has not been irradiated. However, the polarizing section 7 cannot be distinguished from the low extinction-ratio areas 8 by the naked eye.

However, when the anti-counterfeiting medium is visually observed through a verification device 9 configured by a polarizer while the verification device 9 is held over the anti-counterfeiting medium, the low extinction-ratio areas 8 are contrasted against the polarizing section 7 so that the former can be better distinguished from the latter.

Accordingly, the image as shown in FIG. 2A can be visually observed. Specifically, the contrast of the low extinction-ratio areas 8 against the polarizing section 7 enables visual observation of the low extinction-ratio areas 8. As a result, the image 6 continuously formed across the coloring layer 3 and the low extinction-ratio areas 8 can be visually observed.

Portions of the image 6 formed in the coloring layer 3 of the recording medium 1 include a partial record of the information TP123 that is a character string. On the other hand, of the information TP123, portions of the image formed in the polarizer layer 4 correspond to portions other than the image portions recorded in the coloring layer 3, i.e. correspond to a record of the information complementing the information recorded in the image portions of the coloring layer 3. More specifically, the image portions formed in the coloring layer 3 include a partial image of T, P, 1, 2 and 3. On the other hand, the image portions formed in the polarizer layer 4 include information of T, P, 1, 2 and 3 which is different from the information recorded in the image portions of the coloring layer 3, i.e. include information complementing the information recorded in the image portions of the coloring layer 3. Thus, the image 6 formed across the coloring layer 3 and the polarizer layer 4 includes the information TP123.

Specifically, the image portions formed in the polarizer layer 4, i.e. the image portions formed by the low extinction-ratio areas 8, have a record of the information related to the information recorded in the image portions formed on the coloring layer 3 of the recording medium 1, i.e. the image portions formed of the modified portions of the coloring layer 3.

When the verification device 9 is rotated by 90° relative to a theoretical rotation axis extending in the thickness direction of the anti-counterfeiting medium, the contrast of the low extinction-ratio areas 8 against the polarizing section 7 is reduced or eliminated, with a resultant image altered as shown in FIG. 2B. In the following description, the 90° rotation of the verification device 9 about the theoretical rotation axis extending in the thickness direction of the anti-counterfeiting medium is expressed as tilting the verification device 9 by 90°.

Figure 3A:
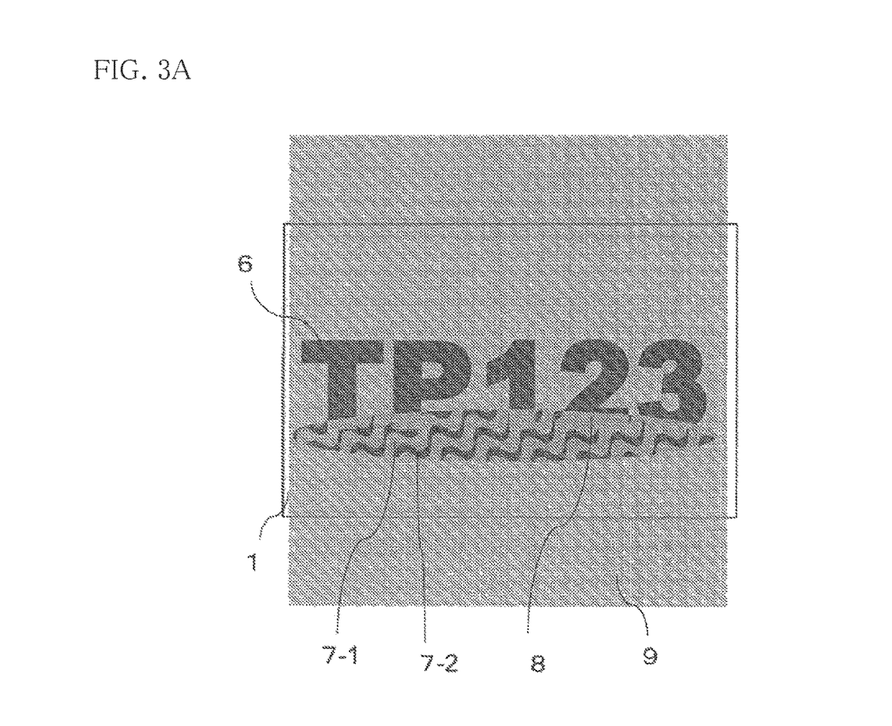
FIGS. 3A and 3B show a set of diagrams each illustrating a latent image which can be visually observed when a verification device is held over an anti-counterfeiting medium that uses a biaxially oriented polarizer layer.
Figure 3B:
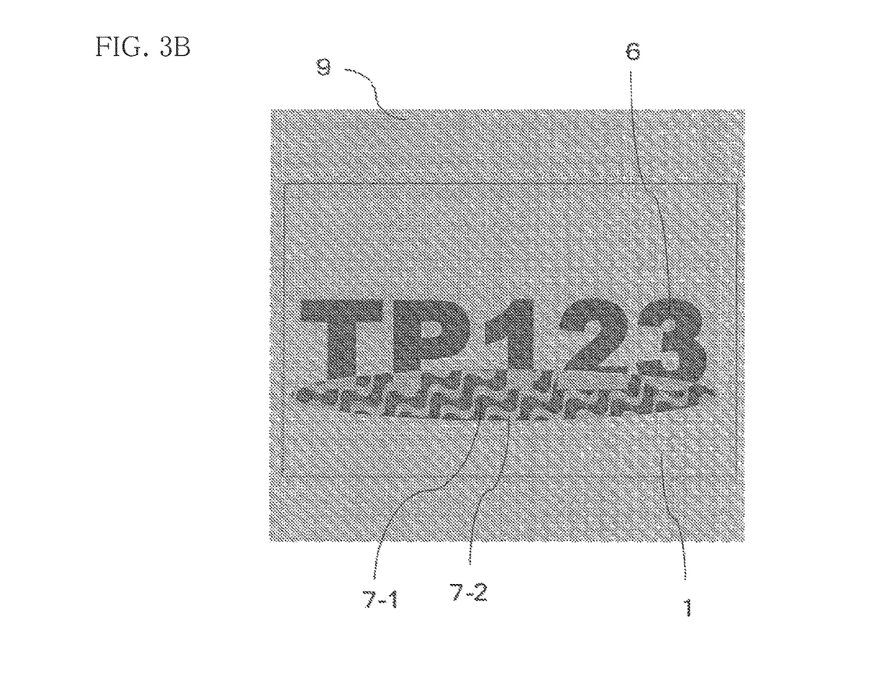

The polarizer layer 4 is not limited to one having uniaxial orientation properties as described above, but may be a layer having biaxial orientation properties. FIGS. 3A and 3B show a set of diagrams each illustrating a latent image which can be visually observed when a verification device is held over an anti-counterfeiting medium which is provided with a polarizer layer having biaxial orientation properties.

In the anti-counterfeiting medium shown in the diagrams of FIGS. 3A and 3B, the polarizer layer 4 is irradiated with the laser 5, similar to the polarizer layer 4 described above, and thus partially exhibits low polarization. Accordingly, the polarizer layer 4 of FIGS. 3A and 3B has a polarizing section 7 and low extinction-ratio areas 8. However, the polarizing section 7 cannot be directly visually distinguished from the low extinction-ratio areas 8 by the naked eye. The polarizing section 7 includes first polarizing sections 7-1 and second polarizing sections 7-2. The orientation direction of the first polarizing sections 7-1 is different from that of the second polarizing sections 7-2.

Therefore, when the anti-counterfeiting medium is visually observed with the verification device 9 configured by a polarizer being held over the medium, the low extinction-ratio areas 8 are contrasted against the polarizing section 7, enabling the low extinction-ratio areas 8 and the polarizing section 7 to be distinguished. Since the polarizer layer 4 is biaxially oriented, i.e. the orientation directions of the first and second polarizing sections 7-1 and 7-2 are different from each other, the first polarizing sections 7-1 are contrasted against the second polarizing sections 7-2, enabling distinction of the first polarizing sections 7-1 from the second polarizing sections 7-2. Therefore, the image as shown in FIG. 3A can be visually observed via the verification device 9.

Further, when the verification device 9 is tilted by 90°, the first polarizing sections 7-1 are contrasted against the second polarizing sections 7-2, but the contrast is different from the one before the verification device 9 is tilted. Therefore, the image as shown in FIG. 3B can be visually observed via the verification device 9.

In the anti-counterfeiting medium, the polarizer layer 4 may be oriented in a tri- or more axial direction.

Figure 4:
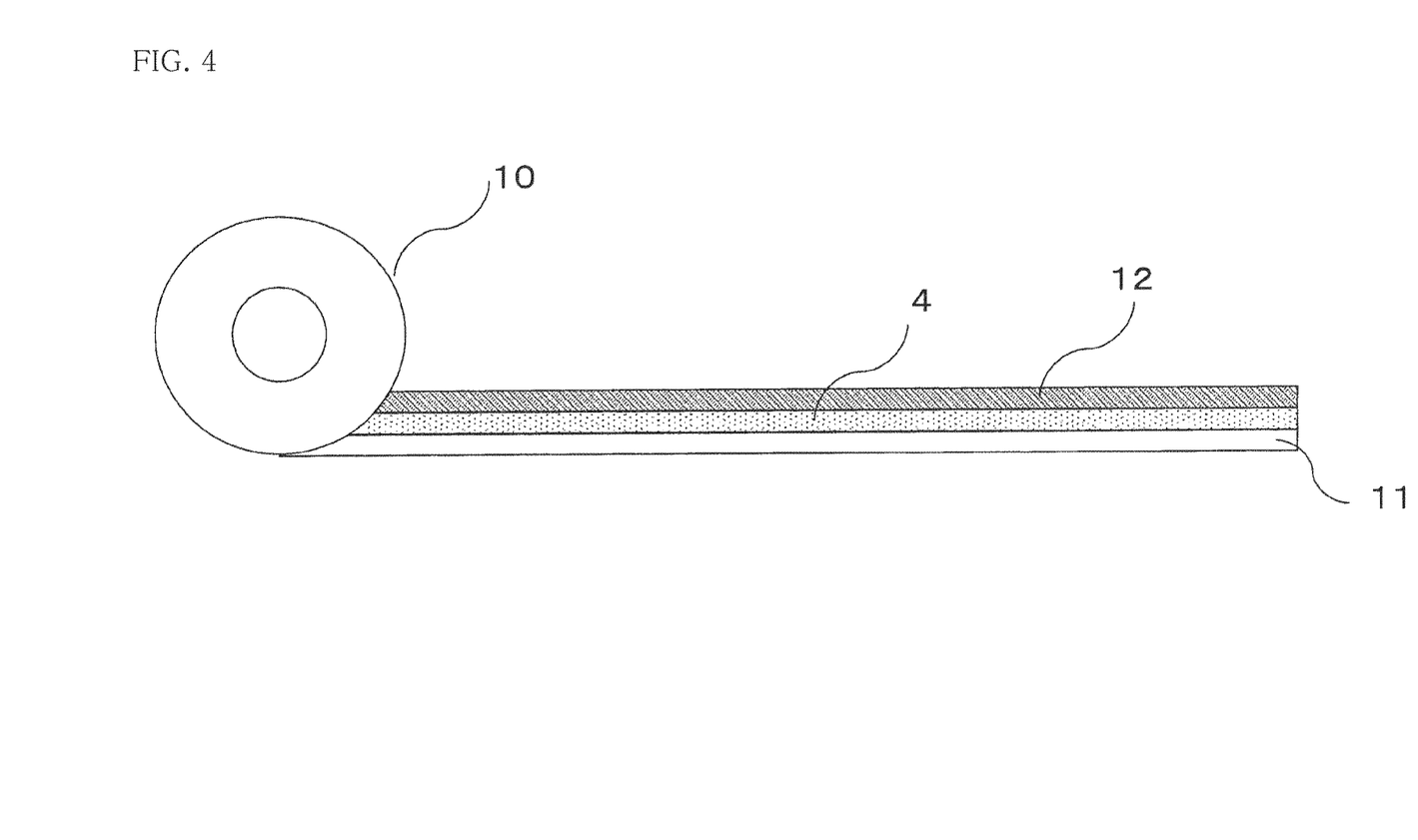
FIG. 4 is a cross-sectional view illustrating a transfer foil for forming the polarizer layer illustrated in FIGS. 1A and 1B.

FIG. 4 is a cross-sectional view illustrating a cross-sectional structure in a thickness direction of a transfer foil for forming the polarizer layer shown in FIGS. 1A and 1B. Together with the cross-sectional structure of the transfer foil, FIG. 4 also shows the transfer foil in a state of being taken up. For example, the polarizer layer of the anti-counterfeiting medium is formed using a transfer foil 10 shown in FIG. 4. The transfer foil 10 includes a support base 11 on a surface of which the polarizer layer 4 and an adhesive layer 12 are laminated in this order. In other words, in the transfer foil 10, the polarizer layer 4 is sandwiched between the support base 11 and the adhesive layer 12.

In the anti-counterfeiting medium related to the present embodiment, the transfer foil 10 including the support base 11 with the polarizer layer 4 and the adhesive layer 12 being formed thereon, is stuck onto the recording medium 1, thereby forming the polarizer layer 4 on the recording medium 1.

Figure 5A:
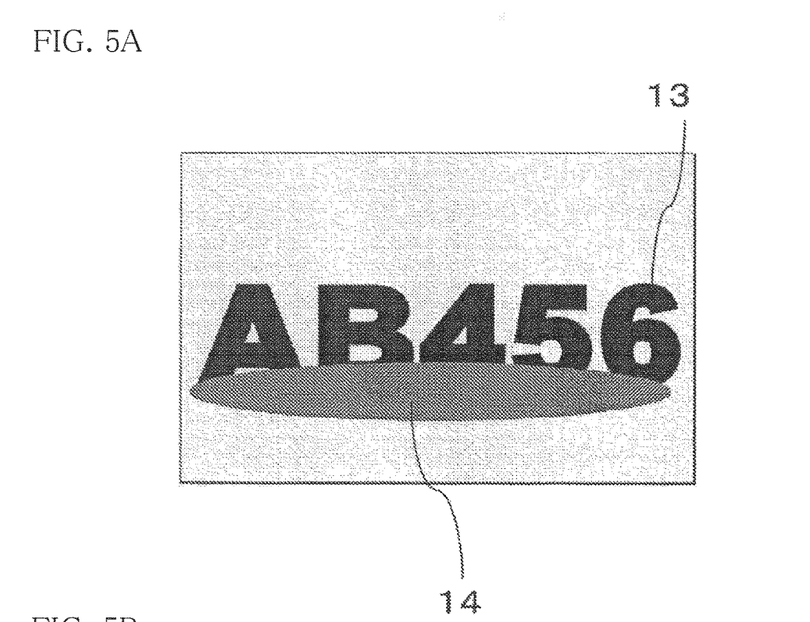
FIG. 5A shows a plan view illustrating a planar structure of a recording medium to demonstrate a forgery procedure for removing and sticking the polarizer layer illustrated in FIGS. 1A and 1B onto a new recording medium.
Figure 5B:
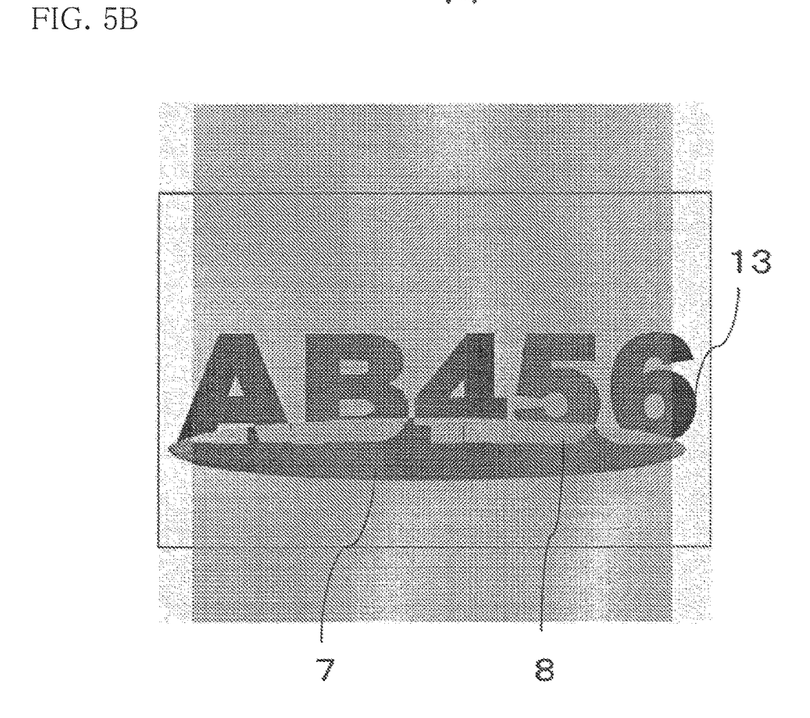
FIG. 5B shows a diagram illustrating a latent image which can be visually observed when a verification device is held over the recording medium.

FIGS. 5A and 5B shows a set of diagrams demonstrating a falsification procedure that can be presumed, in which the polarizer layer 4 of FIG. 1A is removed and stuck onto a new recording medium (base), followed by reapplication of laser engraving as a forgery attempt. FIG. 5A is a diagram illustrating a direct visual observation such as by the naked eye. FIG. 5B is a diagram illustrating a visual observation with the verification device 9 being held over the anti-counterfeiting medium. Only the polarizer layer 4 of FIG. 1A has been removed and stuck onto the new recording medium (base) 1 to form an image 13 by laser engraving. In this case, since the information formed as the low extinction-ratio areas 8 (lower portions of the true character information TP123) as shown in FIG. 1B remain in the polarizer layer 4, the image 13 is not formed continuously with the image drawn in the recording medium 1 (lower portions of the falsified character information "AB456").

Core

The material for the core 2 of the recording medium 1 may be paper. However, polycarbonate (PC) is a recommended material in preparation for the application of the recording media 1 to cards. Besides polycarbonate, preferable materials for the core 2 include polyethylene terephthalates (PETs), amorphous materials among PETs, i.e. polyesters (PETGs) having amorphous thermoplasticity, polyvinyl chlorides (PVCs), ABS resins, and the like.

Coloring Layer

Materials for use as the coloring layer 3 of the recording medium 1 only have to enable marking by laser light, and thus are not particularly limited, such as to inorganic materials, metals, organic dyes, or polymer materials. The point is that the materials used for laser engraving and any known materials used for recordable optical recording media can all be used as materials for the coloring layer 3.

The coloring layer 3 may be a film formed of the above materials, or may be a coated film obtained by dissolving or scattering the above materials in a solvent and wet-coating the solvent onto a film, or a film obtained by dry coating using vacuum vapor deposition, sputtering or the like. Desirably, materials used for the coloring layer 3 have threshold characteristics with which coloring is started by light of a specified intensity or more.

For example, in many cases, materials mainly containing polycarbonate resins, or materials mainly containing polyester resins, i.e. materials generally used as laser graving materials for ID cards, are carbonized, for example, at a specific temperature or more by absorbing laser pulse energy, whereby information is recorded on the materials. Therefore, a film-shaped object made of such materials can be used as the coloring layer 3. Further, a resin coating liquid obtained by dissolving such materials into a solvent may be coated to obtain a coating film for use as the coloring layer 3.

Further, materials that can be used as the coloring layer 3 may be color component materials used for coloring layers producing black or other colors. Thus, heat-sensitive microcapsules are effective because they produce a color in the coloring layer 3 with low energy.

As another example, materials for the coloring layer 3 can include color component materials that contain compounds and photopolymers enabling laser marking. In particular, to produce a color in the coloring layer 3 with low energy by controlling the threshold of the coloring layer 3, it is effective to add a compound that accelerates reformation by irradiation of laser light, or bind a compound, which accelerates reformation by irradiation of laser light, to a resin skeleton.

Methods for producing a color in the coloring layer 3 with low energy may include, for example, a method using a plastic material that is reformed by irradiation of a laser, a plastic material that contains an inorganic material and an organic material for accelerating reformation, or a plastic material that contains at least one inorganic material that generates heat by absorbing the irradiated laser.

Materials that can be used for the coloring layer 3 may include a mixture of a transparent resin and a light-absorptive material. Alternatively, materials that can be used for the coloring layer 3 may include a mixture of a transparent resin and a heat-sensitive colorant. Alternatively, materials that can be used for the coloring layer 3 may include a mixture of a transparent resin, a light-absorptive material and a heat-sensitive colorant.

Transparent resins that can be used include, for example, thermoplastic resins, thermosetting resins, moisture-curable resins, ultraviolet-curable resins, or electron beam-curable resins. Transparent resins that can be used include, for example, acrylic resins, polyester resins, or polyamide-imide resins.

As light-absorptive materials, materials that absorb light and generate heat can be used. Such light-absorptive materials that can be used include, for example, infrared absorbing materials, ultraviolet absorbing materials, or mixtures of these materials.

The infrared absorbing materials that can be used include, for example, carbon materials such as carbon black, organic metal complexes based on phthalocyanine, azo or thioamide compounds, organic infrared absorbing materials based on diimonium, anthraquinone, polymethine, azulenium, squarylium or thiopyrylium compounds, or mixtures of these materials.

The ultraviolet absorbing materials that can be used include, for example, salicylic acid-based ultraviolet absorbing materials such as phenyl salicylate, p-tert-butylphenyl salicylate and p-octylphenyl salicylate, benzophenone-based ultraviolet absorbing materials such as 2,4-dihydroxybenzophenone, 2-hydroxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone and 2-hydroxy-4-methoxy-5-sulfobenzophenone, benzotriazole-based ultraviolet absorbing materials such as 2-(2'-hydroxy-5'-methylphenyl) benzotriazole, 2-(2'-hydroxy-5'-tert-butylphenyl) benzotriazole, 2-(2'-hydroxy-3'-tert-butyl-5'-methylphenyl) benzotriazole and 2-(2'-hydroxy-3',5'-di-tert-amylphenyl) benzotriazole, cyanoacrylate-based ultraviolet absorbing materials such as 2-ethylhexil-2-cyano-3,3'-diphenylacrylate and ethyl-2-cyano-3,3-diphenylacrylate, and mixtures of these materials. Alternatively, the ultraviolet absorbing materials that can be used may include inorganic ultraviolet shielding materials configured by fine powders such as of $TiO_2$ or ZnO.

When a light-absorptive material is used, the content of the light-absorptive material is, for example, within a range of about 0.1 part by mass to about 20 parts by mass per 100 parts by mass of a composition configuring the coloring layer 3. When the content of the light-absorptive material is small, heat generation when irradiating with a laser will be insufficient. Accordingly, color change is unlikely to be caused in each portion of the coloring layer 3 where the light has been irradiated. When the content of the light-absorptive material is excessively large, the performances, such as transparency and durability, of the coloring layer 3 are likely to be insufficient.

The heat-sensitive colorant used is one that causes irreversible color change by being heated to a temperature higher than a color-change temperature. The heat-sensitive colorant may alter from a colorless state to a colored state, or vice versa, by being heated to a temperature higher than a color-change temperature. The heat-sensitive colorant may be in a colored state before and after alteration, and may alter from one color-state to a different color-state.

The heat-sensitive colorant used is one that does not cause color change in thermal transfer of the transfer foil 10 and in normal use conditions of the anti-counterfeiting medium. Specifically, the heat-sensitive colorant used is one whose color-change temperature is higher than a glass-transition temperature of at least a heat-sensitive adhesive material configuring the adhesive layer 12. Accordingly, it is preferable that the color-change temperature of the heat-sensitive adhesive material is about 200° C. or more, for example.

Typically, heat-sensitive adhesive materials that can be used include those materials which are known as thermochromic paints. For example, heat-sensitive adhesive materials that can be used include thermochromic organic dyes, metal complex salt crystal, or mixtures of an electron-donating coloration compound, an electron-accepting compound and a polar organic compound. These mixtures may be used as the heat-sensitive colorant.

When the heat-sensitive colorant is used, the content of the heat-sensitive colorant is, for example, within a range of about 0.1 part by mass to about 20 parts by mass per 100 parts by mass of a composition configuring the coloring layer 3. When the content of the heat-sensitive colorant is small, heat generation when irradiating a laser will be insufficient. Accordingly, color change is unlikely to be caused in each portion of the coloring layer 3 where the light has been irradiated. When the content of the heat-sensitive colorant is excessively large, the performances, such as transparency and durability, of the coloring layer 3 are likely to be insufficient.

Polarizer Layer

Desirably, the polarizer layer 4 is one in which a crystal that contains a dichroic dye is oriented. When the crystal containing a dichroic dye is oriented, the dichromatic dye is also oriented in the orientation direction of the crystal. Accordingly, a layer formed of a crystal that contains a dichroic dye can act as a polarizer layer. When the polarizer layer 4 is used, the liquid crystal molecules are broken by heat generation caused by the laser, while the orientation of the dichroic dye is disturbed. Therefore, of the polarizer layer 4, the portions where the laser has been irradiated will change into the low extinction-ratio areas 8. Specifically, the polarizer layer 4 is configured in such a way that the efficiency of changing light irradiated to the polarizer layer 4 into predetermined polarized light is irreversibly varied by the irradiation of the laser 5. As a result, the polarizing section 7 and the low extinction-ratio areas 8, although not visually distinguishable, are present in the polarizer layer 4. Thus, when the verification device 9 configured by a polarizer is held over the polarizer layer 4, the image 6 continuing from portions drawn in the recording medium 1 to portions drawn in the polarizer layer 4, as shown in FIG. 2A, FIGS. 3A and 3B, can be visually observed via the verification device 9.

The polarizer layer 4 can be obtained by coating a liquid crystal that contains a dichroic dye onto a stretched film, a film subjected to rubbing-alignment treatment, or an oriented film subjected to photo-alignment treatment. The rubbing-alignment method is a method for directly rubbing a surface of a base using a cloth, or a method for rubbing an oriented film formed by coating a polymer solution onto a base using a cloth. The rubbing-alignment method makes use of the nature of the surface of a base or the surface of an oriented film of being altered in a direction in which the surface has been rubbed to permit the liquid crystal molecules to be oriented along the rubbing direction. As materials for the oriented film, polyimide, polyvinyl alcohol (PVA) and the like are used.

When the optical axis of the polarizer layer 4 is oriented along a plurality of axes, a plurality of masks are sequentially arranged on an oriented film one by one. Then, every time one mask is arranged on the film, the surface of the base or the surface of the oriented film is rubbed with a cloth. In this case, it is preferable that the direction in which the surface of the base or the surface of the oriented film is rubbed is changed on a mask basis.

The photo-alignment method is a method in which light having anisotropy, such as polarized light, is applied to an oriented film, or non-polarized light is obliquely applied to an oriented film, to induce rearrangement of the molecules in the oriented film or induce anisotropic chemical reaction. The photo-alignment method utilizes the fact that the provision of anisotropy to an oriented film with the application of light can orient the liquid crystal molecules. Mechanisms for the photo-alignment include provision of light anisotropy to azobenzene derivatives, photodimerization or cross-linkage of derivatives, such as of cinnamic acid ester, coumarin, chalcone and benzophenone, and photodecomposition such as of polyimide.

Photomasks can be used in the light-alignment method. Of the plurality of photomasks, those which are used for irradiating light to the oriented film are switched in turn. Every time the photomasks are switched, polarized lights having mutually different polarization directions, typically linearly polarized lights or ellipsoidally polarized lights, are sequentially irradiated. This sequential irradiation can form regions which are adjacent in an in-plane direction and have different orientation directions in the oriented film.

When an oriented film is used, the oriented film can be formed by means of a known method, such as gravure coating or microgravure coating. Liquid crystal materials that can be used include photo-curable liquid crystal monomers provided with acrylate at both ends of the mesogenic group, polymer liquid crystals that are cured with the irradiation of EB or UV, polymer liquid crystals that bear a mesogenic group in the polymer backbone, and liquid crystal polymers in which the molecular backbone is oriented. These liquid crystal materials are coated onto a base or an oriented film, followed by heat treatment at a temperature a little lower than an NI point that causes phase transition, thereby accelerating orientation.

The polarizer layer 4 may be provided thereon with a shielding layer that partially shields the laser 5. In this case, the shielding layer only has to be a metal vapor-deposited film or a dielectric vapor-deposited film, for example. When the laser 5 has an ultraviolet wavelength, the shielding layer used may contain an ultraviolet absorber. When the laser 5 has an infrared wavelength, the shielding layer used may contain an infrared absorber.

Formation of a shielding layer can lead to breakage of the liquid crystal molecules of the polarizer layer 4 with the heat generated by the laser 5, depending on the degree of shielding of the laser 5 by the shielding layer, and lead to control of the degree of disorder in the orientation of the dichroic dye. Thus, carbonization of the polarizer layer 4 caused by excessive heat generation of the laser 5 can be minimized. Further, partial formation of the shielding layer on the polarizer layer 4 can vary the extinction ratio between a portion where the shielding layer is formed and a portion where not formed.

Support Base

As described above, the polarizer layer 4 may be formed by transferring the transfer foil 10 including the polarizer layer 4 onto the recording medium 1. As the support base 11 for the transfer foil, a non-stretched film prepared by extruding or casting, a stretched film prepared by stretching, or the like can be used. Stretched films include uniaxially stretched films and biaxially stretched films, both of which can be used. It should be noted that the method of stretching film is different between uniaxially stretched films and biaxially stretched films.

In the anti-counterfeiting medium of the present embodiment, the orientation direction of the polarizer layer 4 may be uniaxial. However, it is preferable for the polarizer layer 4 to have at least biaxial orientation direction.

As materials for the non-stretched film or stretched film, mention can be made of cellophane, polycarbonate (PC), polyethylene (PE), polypropylene (PP), polyolefin (PO), ethylene-vinyl alcohol (EVOH), polyvinyl alcohol (PVA), polyvinyl chloride, polyethylene naphthalate (PEN), polyethylene terephthalate (PET), nylon, acrylic resins, triacetylcellulose (TAC), and the like.

A stretched film may be used as the support base 11 and a uniaxially oriented polarizer layer 4 may be formed on the support base 11. In this case, some stretched films can be used without the necessity of particularly performing orientation treatment. On the other hand, a stretched film may be used as the support base 11 and a polarizer layer 4 oriented in a plurality of axial directions may be formed on the support base 11. Alternatively, a non-stretched film may be used as the support base 11. In these cases, the surface of the support base 11 is required to be subjected to rubbing, or the oriented film formed on the support base 11 is required to be subjected to orientation treatment.

Adhesive Layer

As a material for the adhesive layer 12, a heat-sensitive adhesive that exhibits viscosity when heated is used. The adhesive layer 12 is formed by coating a resin having such characteristics onto a base by means of a gravure coater, a microgravure coater, a roll coater, or the like. Materials that can be used for the adhesive layer 12 include thermoplastic resins, such as acrylic resins, vinyl chloride-vinyl acetate copolymers, epoxies, and EVAs.

Transfer

The transfer foil 10 described above is transferred onto the recording medium 1 by means of spot transfer based on an up-down method, or stripe transfer technique based on a roll transfer method. For example, in the up-down method, the transfer foil 10 is placed on the recording medium 1 such that the adhesive layer 12 of the transfer foil 10 is in contact with the recording medium 1. Then, the transfer foil 10 is pressed by a heated hot stamp to soften the portion of the adhesive layer 12 facing the hot stamp. Then, after the adhesive layer 12 has been adhered to the recording medium 1, the support base 11 is separated from the polarizer layer 4 to thereby transfer the adhesive layer 12 and the polarizer layer 4 to the recording medium 1. It should be noted that, in FIG. 1A, the adhesive layer 12 is omitted from illustration.

Laser

As the types of laser used for marking, mention can be made of a far-infrared laser represented by a $CO_2$ laser, near-infrared pulsed laser represented by Nd:YAG laser or Nd:YVO laser, pulsed laser of visual light, excimer laser, ultraviolet laser using third harmonics of a Nd:YAG laser or Nd:YVO laser, semiconductor laser, femtosecond laser, picosecond laser, and the like. In particular, Nd:YAG lasers and Nd:YVO lasers have merits of high output and high pulse stability. Lasers using third harmonics of an Nd:YAG laser or Nd:YVO laser have merits of high resolution, the marked material's absorbing ultraviolet light, and the like. With an ultrashort pulsed laser, such as a femtosecond laser and picosecond laser, the binding of molecules contained in the material to be marked can be cut without the necessity of bringing the material into a high-temperature state, enabling nonthermal writing. Further, a YAG laser or diode laser can be a device which is comparatively small but can generate a large amount of energy. Accordingly, such YAG lasers or diode lasers enable on-demand information recording.

Image

FIG. 1B shows an example of character information as the image 6 formed by laser engraving. However, the image 6 provided to the anti-counterfeiting medium may include personal information. Personal information includes personal authentication information used for authenticating a person. For example, the personal authentication information can be classified into biological information and non-biological personal information.

Biological information corresponds to characteristics unique to each person among the characteristics of a living individual. For example, biological information includes an image or a pattern of at least one of the face, fingerprints, veins, and the like.

Non-biological personal information corresponds to personal information other than biological information. For example, non-biological personal information includes at least one of name, date of birth, age, blood type, sex, nationality, address, domicile of origin, phone number, affiliation, and position in society. Non-biological personal information may include character information inputted by typing, i.e. formed by a prescribed device, or may include characters inputted by reading a handwritten signature using a reader, i.e. character information formed on the basis of the information read by a reader, or may include both types of character information.

The personal information is not limited to the personal authentication information mentioned above, but may be a country code, sequential serial number, lot number, and the like.

As shown in FIG. 1B, the image 6 is formed continuously across the polarizer layer 4 and the recording medium 1, with portions of the image 6 overlapping with the polarizer layer 4. Specifically, the image 6 has first image portions formed on the recording medium 1 and second image portions formed on the polarizer layer 4, so that a single image 6 is formed by the continuous first and second image portions. The image 6 continuously formed across the polarizer layer 4 and the recording medium 1 can provide continuity between the latent image visually observed when the verification device 9 is held over the recording medium 1, i.e. the image portions recorded on the polarizer layer 4, and the image portions displayed in black, i.e. the image portions recorded on the recording medium 1.

Further, if the anti-counterfeiting medium is falsified by re-sticking the polarizer layer 4 onto a different recording medium 1, the information recorded on the polarizer layer 4 prior to the falsification remains being recorded in the polarizer layer 4 as a latent image. Therefore, if new information is recorded on the polarizer layer 4 by falsification, the image portions formed on the recording medium 1 and the latent image recorded on the polarizer layer 14 are visually observed as a discontinuous pattern, as shown in FIG. 5B. In particular, in the anti-counterfeiting medium shown in FIG. 5B, the lower portion of the numeral 4 and the lower portion of the numeral 6 of the characters recorded on the anti-counterfeiting medium prominently show the discontinuity between the image portion formed on the recording medium 1 and the latent image recorded on the polarizer layer 14. Such a discontinuous pattern is an evidence of the falsification of the anti-counterfeiting medium. Accordingly, one who has visually observed such a discontinuous pattern can easily note the falsification of the anti-counterfeiting medium. In this way, according to the anti-counterfeiting medium of the present embodiment, authenticity of the anti-counterfeiting medium can be easily determined.

Modifications

The foregoing embodiment may be appropriately modified and implemented as set forth below.

The image 6 continuing from the polarizer layer 4 to the recording medium 1 does not necessarily have to be formed by laser engraving, but may, for example, be formed by heating the polarizer layer 4 and the recording medium 1 by means of a thermal head.

The thermal head used for marking may be one which is provided with a plurality of linearly arrayed heating elements. Using such a thermal head, the temperature of the recording medium 1 or the polarizer layer 4 can be more easily adjusted than in the case of performing laser engraving described above. Thus, use of a thermal head in marking has an advantage of preventing excessive alteration of the recording medium 1.

The image 6 continuously provided across the polarizer layer 4 and the recording medium 1 may, for example, be formed by an inkjet method by jetting a solvent so as to continue across the polarizer layer 4 to the recording medium 1. In this configuration, the solvent to be jetted onto the polarizer layer 4 and the recording medium 1 only has to be one that is able to disturb the orientation of the polarizer layer 4 and produce color in the coloring layer 3 of the recording medium 1. If only the orientation of the polarizer layer 4 is disturbed and color is produced in the coloring layer 3, the solvent jetted onto the polarizer layer 4 may be the same as the one jetted toward the recording medium 1. Alternatively, the solvent jetted onto the polarizer layer 4 may be different from the one jetted onto the recording medium 1.

In short, any layer can be used as the polarizer layer 4 if the layer is configured such that the efficiency of changing the irradiated light into polarized light is irreversibly varied by a specific external stimulation.

The information recorded in the image 6 may be a word having a given meaning, that is, a character string composed of several letters, such as a phrase, an English word, or a name. When the information recorded in the image 6 is a word having a given meaning, some letters of the word may be recorded in the image portions formed in the coloring layer 3, and the remaining letters may be recorded in the image portions formed in the polarizer layer 4. For example, if the word having a given meaning is PRINT, it may be so configured that letters P, N and T of the PRINT are recorded in the image portions formed in the coloring layer 3, and letters R and I are recorded in the image portions formed in the polarizer layer 4. In other words, a continuous single image does not necessarily have to be formed across the coloring layer 3 and the polarizer layer 4. With this configuration as well, the information which is recorded in the image portions formed in the coloring layer 3 can be correlated to the information which is recorded in the image portions formed in the polarizer layer 4.

The image 6 is not limited to a letter string as described above, but may be information expressed, for example, by a figure, such as a circle and a polygon, having a predetermined shape, or a pattern formed by a combination of several figures, or the like. Further, it is preferable that the information which is recorded in the image portions formed in the coloring layer 3 is correlated to the information which is recorded in the image portions formed in the polarizer layer 4. In other words, the information recorded in some image portions may complement the information recorded in some other image portions to thereby form information as a single figure or a single pattern. With this configuration as well, the information which is recorded in the image portions formed in the coloring layer 3 can be correlated to the information which is recorded in the image portions formed in the polarizer layer 4.

The information which is recorded in the image portions formed in the coloring layer 3 does not necessarily have to be correlated to the image portions formed in the polarizer layer 4. With this configuration as well, if image portions are formed in the coloring layer 3 and the polarizer layer 4, the following advantageous effects can be obtained. Specifically, in the event that the polarizer layer 4 is stuck onto a different recording medium 1 which should not originally be stuck to the polarizer layer 4 and the different recording medium and the polarizer layer 4 are subjected to an image forming processing, the falsification of the anti-counterfeiting medium can be easily confirmed using the image portions possessed by the polarizer layer 4.

EXAMPLES

The following description sets forth some examples of the present invention.

Lumirror 19F60 was used as the support base 11. A resin for producing oriented films was dissolved to prepare a solution for an oriented film. Then, the oriented film solution was coated onto the support base 11 by means of microgravure to form a coated film. After that, the coated film was subjected to orientation treatment by rubbing it with a rubbing cloth, along a flow direction of the coated film and in the full width thereof, thereby obtaining an oriented film.

After that, 10 parts of dichroic dye was added to 100 parts of UV-curable liquid crystal UCL-008 (manufactured by DIC Corporation) to prepare a solution for the polarizer. Then, the polarizer solution was coated onto the oriented film by means of microgravure so that the film thickness was 2.5 µm. Then, the coated film was annealed, followed by irradiation of UV to the coated film under an oxygen atmosphere, thereby curing the coated film. As a result, there was obtained the polarizer layer 4 having a transmission axis relative to the flow direction. After that, the adhesive layer 12 of an acrylic resin was formed throughout the surface of the polarizer layer 4 by means of microgravure, thereby obtaining a transfer foil 10.

Further, the core 2 formed of polycarbonate was prepared, followed by dry-laminating a polyester film (Melinex-Leo 100 µm manufactured by Teijin DuPont) for laser engraving, as the coloring layer 3, onto the core 2 to obtain the recording medium 1. The transfer foil 10 was transferred to a part of the surface of the coloring layer 3, or a part of the recording medium 1, the surface being opposite to the surface contacting the core 2, by means of a hot stamp that has been heated to 120° C.

After that, using a laser marker (YAG pulse laser manufactured by Keyence Corporation), the character information TP123 was continuously recorded across a part of the recording medium 1 and a part of the polarizer layer 4. As a result, portions of the recording medium 1 irradiated with the laser were displayed in black, and the polarized layer 4 was divided into the polarizing section 7 where the laser has not been irradiated and the low extinction-ratio areas 8 where the laser has been irradiated. Thus, the anti-counterfeiting medium was obtained in which the image shown in FIG. 1B was visually observed.

Further, iodine was impregnated in PVA to prepare a stretched and oriented absorption-type polarizer as the verification device 9. Then, the anti-counterfeiting medium was observed via the verification device 9. Thus, as shown in FIG. 2A, it was recognized that a latent image, which continued from the image portions recorded in the recording medium 1, could be visually observed in portions of the polarizer layer 4.

The polarizer layer 4 was peeled off and re-stuck onto a different recording medium 1, followed by forming a continuous image across the polarizer layer 4 and the different recording medium 1. In this case, as shown in FIG. 5B, the image recorded in the recording medium 1 and the latent image did not form a single continuous pattern. Thus, it was immediately apparent to anyone that the anti-counterfeiting medium was a falsified product.

More specifically, after the polarizer layer 4 included in the transfer foil 10 had been transferred to a part of the recording medium 1, laser engraving printing was conducted continuously across the polarizer layer 4 and the recording medium 1. Thus, in the image 6 printed on the anti-counterfeiting medium, portions partially appearing in the recording medium 1 and printed in black could be visually observed. In other words, the image 6 could be partially visually observed. On the other hand, of the image 6, the portions formed in the polarizer layer 4 became low extinction-ratio areas 8 by the heat generated by the laser. However, since the polarizing section 7 could not be visually distinguished from the low extinction-ratio areas 8, the low extinction-ratio areas 8 could not be visually recognized. In contrast, when the verification device 9 was held over the anti-counterfeiting medium, the portions of the image 6 formed in the polarizer layer 4 were visually observed via the verification device 9. Thus, in the anti-counterfeiting medium that had been falsified according to the procedure mentioned above, it was confirmed that the portions of the image 6 visually confirmed in the polarizer layer 4 were not continuous to the image portions formed in the recording medium 1. In this way, in the authenticity determination, the anti-counterfeiting medium could be immediately determined to be falsified.

As described above, an information authentication medium highly in need of preventing forgery or falsification is provided thereon with an image-forming body in which identification information ensuring at least uniqueness or authenticity is printed or drawn. Thus, there can be provided an anti-counterfeiting medium which is able to facilitate authenticity determination and highly enhance prevention of forgery or falsification.

INDUSTRIAL APPLICABILITY

The anti-counterfeiting medium obtained by the present invention aims to make it more difficult to forge or falsify the image-forming body which is formed on an information authentication medium. In the image-forming body, a facial image, fingerprints, an identification number or the like as identification information is printed or drawn. The anti-counterfeiting medium can be used for booklets, such as passports and visas, or information authentication media, such as cards. In these information authentication media, a latent image using the polarizer layer is combined with an on-demand printing technique so that identification information can be easily formed. Thus, the anti-counterfeiting medium has a possibility of being widely used. For example, an official who deals with information authentication media, which are at least associated with uniqueness or authenticity, can easily determine authenticity of the information to be determined. At the same time, such an official can immediately find forgery or falsification of the information to be determined, for prompt exposure of the forgery or falsification.

What is claimed is:

1. An anti-counterfeiting medium comprising:
   a recording medium comprising a core layer and a coloring layer so that a lower surface of the coloring layer is in direct contact with the core layer, with the coloring layer of the recording medium having formed thereon a first image portion that is a part of the coloring layer of the recording medium and has a nature different from another portion of the coloring layer of the recording medium different from a portion of the first image portion; and
   a polarizer layer arranged on a part of an upper surface, which is opposite to the lower surface, of the coloring layer of the recording medium, with the polarizer layer comprising a polarizing section and a low extinction-ratio area that forms a second image portion, the low extinction-ratio area exhibits an extinction ratio lower than the polarizing section of the polarizer layer, wherein the polarizer layer contains a liquid crystal containing a dichroic dye, wherein in the polarizing section, the dichroic dye is oriented, wherein in the low extinction-ratio area, an orientation of the dichroic dye is disturbed by laser irradiation, and wherein the liquid crystal is a UV-curable liquid crystal.

2. The anti-counterfeiting medium according to claim 1, wherein the second image portion formed in the polarizer layer is recorded with information related to information recorded in the first image portion formed in the coloring layer of the recording medium.

3. The anti-counterfeiting medium according to claim 1, wherein the dichroic dye in the polarizing section of the polarizer layer is uniaxially oriented.

4. The anti-counterfeiting medium according to claim 1, wherein the dichroic dye in the polarizing section of the polarizer layer is at least biaxially oriented.

5. The anti-counterfeiting medium according to claim 1, wherein the first image portion, or the second image portion, or both, include personal information.

6. The anti-counterfeiting medium of claim 1, wherein the polarizer layer is applied on the recording medium by sticking a transfer foil comprising a support base, an adhesive layer and the polarizer between the support base and the adhesive layer and separating the support layer from the polarizer layer to thereby transfer the adhesive layer and the polarizer layer to the recording medium.

7. The anti-counterfeiting medium of claim 6, wherein the base support is an oriented film, wherein an orientation of the film determines an orientation of the polarizing layer.

8. The anti-counterfeiting medium of claim 6, wherein the adhesive layer comprises a heat-sensitive adhesive.

9. The anti-counter medium of claim 1, wherein the core layer comprises paper, polycarbonate, s polyethylene terephthalate, polyvinyl chloride, or acrylonitrile butadiene styrene resin and the coloring layer comprises polycarbonate resin or a polyester resin.

10. The anti-counterfeiting medium of claim 1, wherein the core layer comprises polycarbonate and the coloring layer is a polyester film laminated onto the core layer.

11. An anti-counterfeiting medium comprising:
    a recording medium comprising a core layer and a coloring layer so that a lower surface of the coloring layer is in direct contact with the core layer;
    a polarizer layer arranged on a part of an upper surface, which is opposite to the lower surface, of the coloring layer of the recording medium and configured to irreversibly vary an efficiency of changing light irradiated to the polarizer layer into polarized light, by means of a specific external stimulation; and an image continuously formed across the coloring layer of the recording medium and the polarizer layer, wherein:

the image includes a first portion formed in the coloring layer of the recording medium and a second portion formed in the polarizer layer;

the first portion of the image has a color different from that of a portion of the coloring layer of the recording medium where the first portion is not formed; and the second portion of the image has a lower efficiency of changing the light irradiated to the polarizer layer into polarized light than in a polarizing portion of the polarizer layer, wherein the polarizer layer contains a liquid crystal containing a dichroic dye, wherein in the polarizing portion of the polarizer layer, the dichroic dye is oriented, wherein in the portion of the polarizer layer corresponding to the second portion of the image, an orientation of the dichroic dye is disturbed by laser irradiation, and wherein the liquid crystal is a UV-curable liquid crystal.

12. The anti-counterfeiting medium according to claim 11, wherein the dichroic dye in the polarizing section of the polarizer layer is uniaxially oriented.

13. The anti-counterfeiting medium according to claim 11, wherein the dichroic dye in the polarizing section of the polarizer layer is at least biaxially oriented.

14. The anti-counter medium of claim 11, wherein the core layer comprises paper, polycarbonate, polyethylene terephthalate, polyvinyl chloride, or acrylonitrile butadiene styrene resin and the coloring layer comprises polycarbonate resin or a polyester resin.

15. The anti-counterfeiting medium of claim 11, wherein the core layer comprises polycarbonate and the coloring layer is a polyester film laminated onto the core layer.

* * * * *